(12) United States Patent
Gomadam et al.

(10) Patent No.: US 8,976,886 B2
(45) Date of Patent: Mar. 10, 2015

(54) METHOD AND APPARATUS FOR JOINTLY PERFORMING CHANNEL ESTIMATION AND INTERFERENCE ESTIMATION IN A WIRELESS COMMUNICATION SYSTEM

(71) Applicant: Marvell World Trade Ltd., St. Michael (BB)

(72) Inventors: Krishna Srikanth Gomadam, San Jose, CA (US); Yakun Sun, Sunnyvale, CA (US); Raphael Cendrillon, Palo Alto, CA (US); Hui-Ling Lou, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 39 days.

(21) Appl. No.: 13/852,576

(22) Filed: Mar. 28, 2013

(65) Prior Publication Data

US 2013/0266100 A1    Oct. 10, 2013

Related U.S. Application Data

(60) Provisional application No. 61/620,911, filed on Apr. 5, 2012.

(51) Int. Cl.
*H04L 25/02* (2006.01)
*H04L 5/00* (2006.01)
(Continued)

(52) U.S. Cl.
CPC .......... *H04L 25/0242* (2013.01); *H04L 5/0023* (2013.01); *H04L 25/0228* (2013.01); *H04L 25/03159* (2013.01)
USPC ........ 375/267; 375/260; 375/259; 455/67.16; 455/67.11; 455/39; 370/330; 370/329; 370/328; 370/310

(58) Field of Classification Search
CPC ............ H04L 25/0202; H04L 25/0206; H04L 25/0204; H04L 25/0222; H04L 25/0232; H04L 25/0244; H04L 25/025; H04L 25/0256; H04L 25/03305; H04L 25/03331; H04B 7/0452; H04J 11/0053; H04W 24/02
USPC ............ 375/260, 267, 259; 455/67.16, 67.11, 455/39; 370/330, 329, 328, 310
See application file for complete search history.

(56) References Cited

U.S. PATENT DOCUMENTS

2007/0024748 A1*   2/2007   Kubota ......................... 348/533
2010/0029262 A1    2/2010   Wang et al.
(Continued)

OTHER PUBLICATIONS

Youngjin Choi, "New form of block matrix inversion," Advanced Intelligent Mechatronics, 2009. AIM 2009. IEEE/ASME International Conference on , vol., No., pp. 1952,1957, Jul. 14-17, 2009.*

(Continued)

*Primary Examiner* — Chieh M Fan
*Assistant Examiner* — Michelle M Koeth

(57) ABSTRACT

Systems and methods for estimating characteristics of a channel are provided. A transmission of known reference data is received at a receiving device. The reference data is transmitted over the channel that includes one or more desired layers and one or more interfering layers. Characteristics of the channel are determined based on the known reference data, where the determining includes a joint estimation of the one or more desired layers and the one or more interfering layers. The determining includes selecting certain of the layers to be estimated at each of the known reference data and selecting certain of the layers to be estimated over a range of the known reference data. The determining includes solving an equation to jointly estimate the one or more desired layers and the one or more interfering layers based on the selections. The selections reduce a number of unknown values in the equation.

20 Claims, 6 Drawing Sheets

(51) Int. Cl.
*H04L 25/03* (2006.01)
*H04L 1/04* (2006.01)

(56) References Cited

U.S. PATENT DOCUMENTS

2010/0316163 A1  12/2010  Forenza et al.
2011/0267937 A1  11/2011  Yoo et al.
2011/0293028 A1*  12/2011  Panicker et al. .............. 375/260
2012/0300867 A1*  11/2012  Chen et al. .................... 375/267

OTHER PUBLICATIONS

International Search Report and Written Opinion dated Jul. 18, 2013 from related/corresponding PCT Patent Application No. PCT/US13/34326 filed Mar. 28, 2013 (11 pages).

* cited by examiner $$y(f) = S(f)\begin{bmatrix} h_1(f) \\ h_2(f) \\ h_3(f) \\ h_4(f) \end{bmatrix} + n(f)$$

METHOD AND APPARATUS FOR JOINTLY PERFORMING CHANNEL ESTIMATION AND INTERFERENCE ESTIMATION IN A WIRELESS COMMUNICATION SYSTEM

CROSS-REFERENCE TO RELATED APPLICATIONS

This claims priority to U.S. Provisional Patent Application 61/620,911, filed on Apr. 5, 2012, which is incorporated herein by reference.

TECHNICAL FIELD

The technology described in this document relates generally to wireless communications and more particularly to systems and methods for estimating characteristics of a wireless communication channel.

BACKGROUND

In the field of wireless communications, MIMO-OFDM (Multiple-Input and Multiple-Output, Orthogonal Frequency-Division Multiplexing) technology has been used to achieve increased data throughput and link range without requiring additional bandwidth or increased transmission power. MIMO-OFDM technology utilizes multiple transmission antennas at a transmitter and multiple receive antennas at a receiver to enable a multipath rich environment with multiple orthogonal channels existing between the transmitter and the receiver. Data signals can be transmitted in parallel over these channels, thus enabling the increased data throughput and link range. Because of its advantageous properties, MIMO-OFDM is the air-interface technology used in numerous wireless communication standards, such as IEEE 802.11n (WiFi), 4G, 3GPP Long Term Evolution (LTE), WiMAX, and HSPA+. For efficient operation, in terms of capacity, block error rate, and other metrics, estimation of the communication channel between the receiver and transmitter may be performed at the receiver.

SUMMARY

The present disclosure is directed to systems and methods for estimating characteristics of a channel. In a method for estimating characteristics of a channel, a transmission of known reference data is received at a receiving device. The reference data is transmitted over the channel that includes one or more desired layers and one or more interfering layers. Characteristics of the channel are determined based on the known reference data, where the determining includes a joint estimation of the one or more desired layers and the one or more interfering layers. The determining includes selecting certain of the layers to be estimated at each of the known reference data. The determining also includes selecting certain of the layers to be estimated over a range of the known reference data. The determining further includes solving an equation to jointly estimate the one or more desired layers and the one or more interfering layers based on the selections. The selections reduce a number of unknown values in the equation.

In another example, a receiver for estimating characteristics of a communication channel includes a processing system and a memory coupled to the processing system. The processing system is configured to execute steps including receiving a transmission of known reference data, where the reference data is transmitted over the channel that includes one or more desired layers and one or more interfering layers. The steps also include determining characteristics of the channel based on the known reference data, where the determining includes a joint estimation of the one or more desired layers and the one or more interfering layers. The determining includes selecting certain of the layers to be estimated at each of the known reference data and selecting certain of the layers to be estimated over a range of the known reference data. The determining further includes solving an equation to jointly estimate the one or more desired layers and the one or more interfering layers based on the selections. The selections reduce a number of unknown values in the equation.

DETAILED DESCRIPTION

Figure 1A:
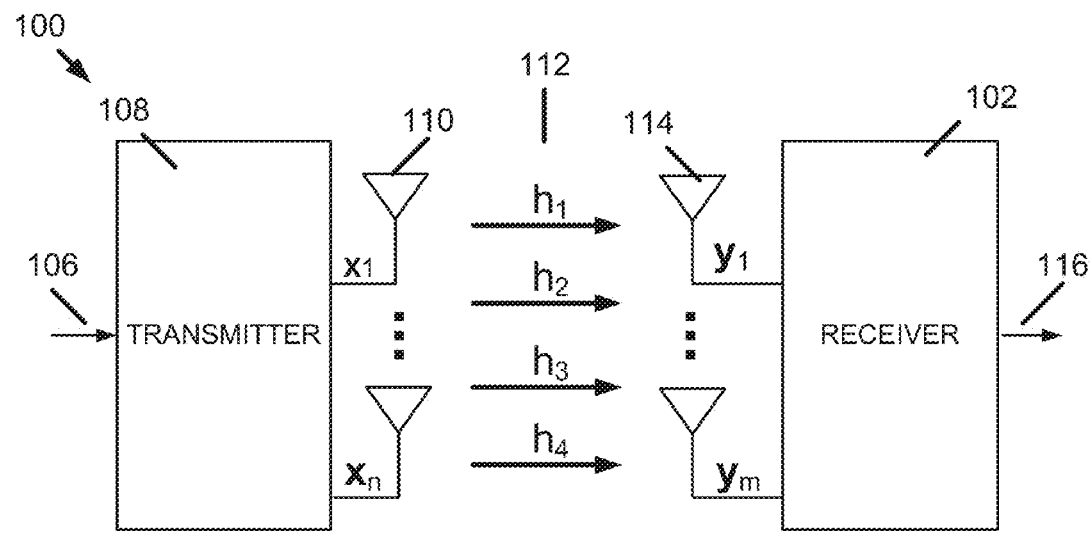
FIG. 1A is a block diagram of an example Multiple-Input and Multiple-Output (MIMO) communication system including a channel with one or more desired layers and one or more interfering layers.

FIG. 1A is a block diagram of an example Multiple-Input and Multiple-Output (MIMO) communication system 100 including a channel 112 with one or more desired layers and one or more interfering layers. In the example communication system 100 of FIG. 1A, an input data stream 106 is received by a transmitter 108 and subsequently transmitted over a plurality of transmission antennas 110. The transmission antennas 110 transmit the input data stream 106 over the channel 112, which includes the one or more desired layers and the one or more interfering layers. The data transmission over the plurality of transmission antennas 110 is received at a plurality of receive antennas 114 of a receiver 102. The channel 112 affects the data transmitted between the transmitter 108 and the receiver 102, such that a modified version of the transmitted signal is received at the receive antennas 114. The received signal may be modified from the transmitted signal due to properties of the channel 112, interference at the receive antennas 114, or by noise of the channel 112, among other reasons. The system 100 can be described generally via the following equation:

$$y = Hx + n,$$

where H is a channel matrix that defines characteristics of the channel 112, x is a data matrix that defines the signal transmitted by the transmitter 108, y is a data matrix that defines the signal received by the receiver 102, and n is a noise matrix that affects the transmitted signal. Pre-coding or beamforming may be used at the transmitter 108 when multiple transmitter antennas 110 are employed. In the equation above, the channel matrix H defines characteristics of the one or more desired layers, as well as characteristics of the one or more interfering layers. Note that the transmitter 106 transmits both the desired layers and the interfering layers in FIG. 1A. This is only used for an example. Alternatively, multiple transmitters may transmit simultaneously, from some of which the desired layers are transmitted, and from others of which the interfering layers are transmitted. In such a case, the transmitter 106 can be assumed as a superset of transmitters, and the following discussions still apply.

For efficient operation (i.e., in terms of capacity, block error rate, etc.) of the system 100, an estimation of the channel 112 is performed at the receiver 102. To perform channel estimation, a transmission of known reference data (i.e., pilot symbols or cell-specific reference signals) is received at the receiver 102. The known reference data is transmitted over the channel 112 including the one or more desired layers and the one or more interfering layers at predetermined time and frequency positions. The receiver 102 uses the known reference data to estimate characteristics of the channel 112 in all time and frequency positions. In the system 100 of FIG. 1A, the receiver 102 performs a joint estimation of the one or more desired layers and the one or more interfering layers of the channel 112. An estimation of the noise and/or residual interference of the system 100 may also be included in the joint estimation process. The joint estimation is performed instead of an independent estimation of the one or more desired layers and the one or more interfering layers. For example, an independent estimation may involve estimation of a desired layer that is separate and independent of a desired layer, and/or an interference and noise estimation.

Figure 1B:
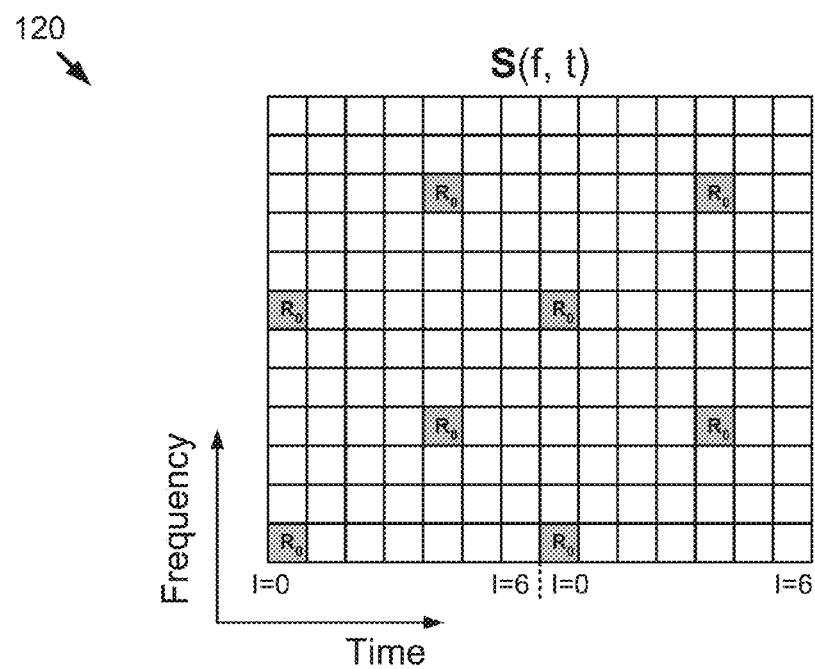
FIG. 1B depicts an example of known reference data used by a receiver to estimate a communication channel.

An example of the known reference data used by the receiver 102 to estimate the channel 112 is depicted at 120 of FIG. 1B. An x-axis of data matrix S(f, t) varies with time, and a y-axis of the data matrix S(f, t) varies with frequency. The darkened cells of the matrix represent known pilot symbols transmitted at predetermined time and frequency positions, which are known in advance by the receiver 102. In the matrix, the known reference data may be considered to be overhead. Thus, to achieve higher throughput, it may be desirable to use a smaller number of reference symbols, as a higher number of reference symbols may degrade spectral efficiency of the system 100. However, if the known reference signal is too sparse, the receiver 102 may have difficulty in accurately estimating the channel 112.

As noted above, the estimation of the channel 112 is a joint estimation, where the one or more desired layers and the one or more interfering layers of the channel 112 are estimated together, rather than via separate, independent estimations. At 100 in FIG. 1A, the channel 112 is illustrated as including layers (i.e., channels, streams) $h_1, h_2, h_3$, and $h_4$, and certain of these layers are desired layers and certain of these layers are interfering layers. At 140 in FIG. 1C, an equation to jointly estimate the one or more desired layers and the one or more interfering layers is as follows:

$$y(f) = S(f) \begin{bmatrix} h_1(f) \\ h_2(f) \\ h_3(f) \\ h_4(f) \end{bmatrix} + n(f),$$

where y(f) is a matrix including observations made at the receiver 102, S(f) is a matrix including the known reference data transmitted by the transmitter 108, $$\begin{bmatrix} h_1(f) \\ h_2(f) \\ h_3(f) \\ h_4(f) \end{bmatrix}$$

is a matrix including variables representing the one or more desired layers and the one or more interfering layers to be estimated, and n(f) is a matrix representing a noise component of the received signal y(f). All variables of the equation are dependent only upon frequency, such that the estimation process includes making an assumption that the one or more desired layers and the one or more interfering layers are constant in time as an example. The equation above is solved as part of the estimation process.

Figures 1C, 1D:
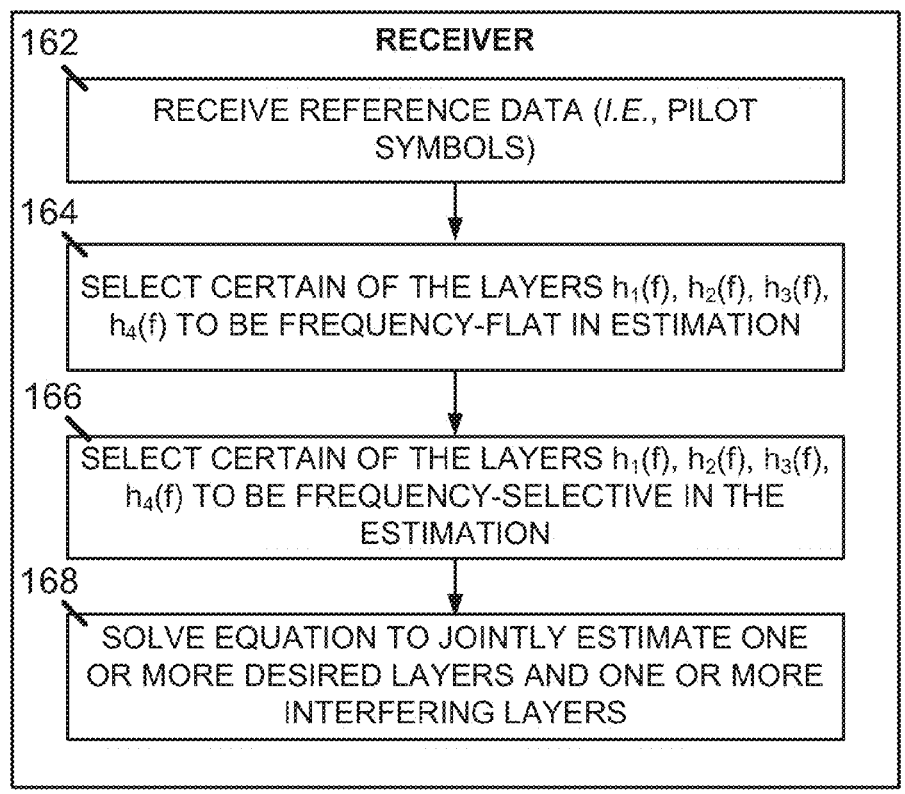
FIG. 1C depicts an equation used to jointly estimate one or more desired layers and one or more interfering layers of a communication channel.
FIG. 1D depicts example steps performed by a receiver to perform joint estimation of one or more desired layers and one or more interfering layers of a communication channel.

At 160 of FIG. 1D, example steps 162, 164, 166, 168 are performed by the receiver 102 to perform the joint estimation of the one or more desired layers and the one or more interfering layers. At 162, the receiver 102 receives the matrix S(f, t) including the known reference data (i.e., the known pilot symbols depicted at 120 of FIG. 1B). The matrix S(f, t) including the known reference data is transmitted over the channel 112 and is thus affected by the characteristics of the channel 112. At 164, certain of the layers $h_1, h_2, h_3$, and $h_4$ of the channel 112 are selected to be frequency-flat in the estimation. At 166, certain of the layers $h_1, h_2, h_3$, and $h_4$ are selected to be frequency-selective in the estimation. The receiver 102 thus performs a partitioning process, such that not all layers are selected as being frequency-flat and not all layers are selected to be frequency-selective in the estimation. The partitioning process may also leave certain layer(s) out of channel estimation process by not selecting such layer(s) in both 164 and 166. At 168, the equation at 140 of FIG. 1C is solved to jointly estimate the one or more desired layers and the one or more interfering layers. The equation at 140 is solved based on the matrix S(f, t) including the known reference data and based on the selections. A number of unknown values in the equation at 140 is reduced by the selection of certain of the layers as being frequency-flat.

Alternatively, the channel estimation may assume the channels for all layers are constant over frequency, and select the layers to be time-flat in 164 and select layers to be time-selective in 166. In yet another example, the channel estimation assumes the channel is not constant over time and frequency, and 164 and 166 can be extended to sub-steps to select layers to be one of (1) time-frequency-flat, (2) time-flat, frequency-selective, (3) time-selective, frequency-flat, (4) time-frequency-selective. Certain layers can still be left out of channel estimation by the partitioning process. Hereafter, the time-constant assumption is used for illustration purposes where it applies.

The selection of certain of the layers to be frequency-flat in the estimation and the selection of certain of the layers to be frequency-selective in the estimation may be made based on a variety of factors. In one example, the selections are made based on an importance of one or more of the layers, a determination of one or more of the interfering layers as being dominant over others of the one or more interfering layers, a degree of mutual correlation among variables to be estimated in reference to the operating regime (e.g., signal to interference ratio, signal to noise ratio), a desired performance and stability in the receiver, or an instrumentation complexity of the receiver. In other examples, the selections are based on one or more design tradeoffs. For example, the selections may be based on a balance between performance (e.g., signal to noise ratio, throughput, etc.) versus computational complexity, where selection of a greater number of layers to be frequency-selective may result in higher performance but may also require a higher computational complexity. The higher computational complexity may, for example, affect a battery life or power consumption of the receiver.

In one example, the one or more desired layers are selected to be frequency-selective, and the one or more interfering layers are selected to be frequency-flat. In another example, a dominant interfering layer of the one or more interfering layers is selected to be frequency-selective, and others of the one or more interfering layers are selected to be frequency-flat. In one example, statistics of the frequency-flat layers may be used instead of instantaneous values associated with these layers.

The system 100 of FIG. 1A was described above as being characterized by the equation y=Hx+n. This equation may be rewritten as follows to further describe the system 100:

$$y(f, t) = \sum_{i=1}^{K} h_i(f, t) x_i(f, t) + n(f, t)$$

where y is a data matrix that defines the signal received by the receiver, $h_i$ is a matrix representing the channel, which includes one or more desired layers and one or more interfering layers, $x_i$ is a matrix including the known reference data (i.e., pilot symbols) transmitted over the channel, and n is a matrix representing noise in the received signal. In this equation, y, $h_i$, $x_i$, and n are functions of both frequency (f) and time (t). Further, the following equality may be used:

$$|S|=\text{size}(S)=N,$$

where N is a number of observations that are made at the receiver. The receiver is configured to estimate characteristics of the channel $h_i$ for all values of i (i.e., the one or more desired layers and the one or more interfering layers of the channel, and for the case that certain layers are left out of channel estimation, partitioning is assumed to be done before where this model applies), f, and t (i.e., all relevant time and frequency positions), given the N noisy observations that define the matrix y. In matrix form, the input-output relationship defined by the system may be written as follows:

$$y = \sum_{i=1}^{K} x_i \text{diag}(h_i) + n$$

Figure 2:
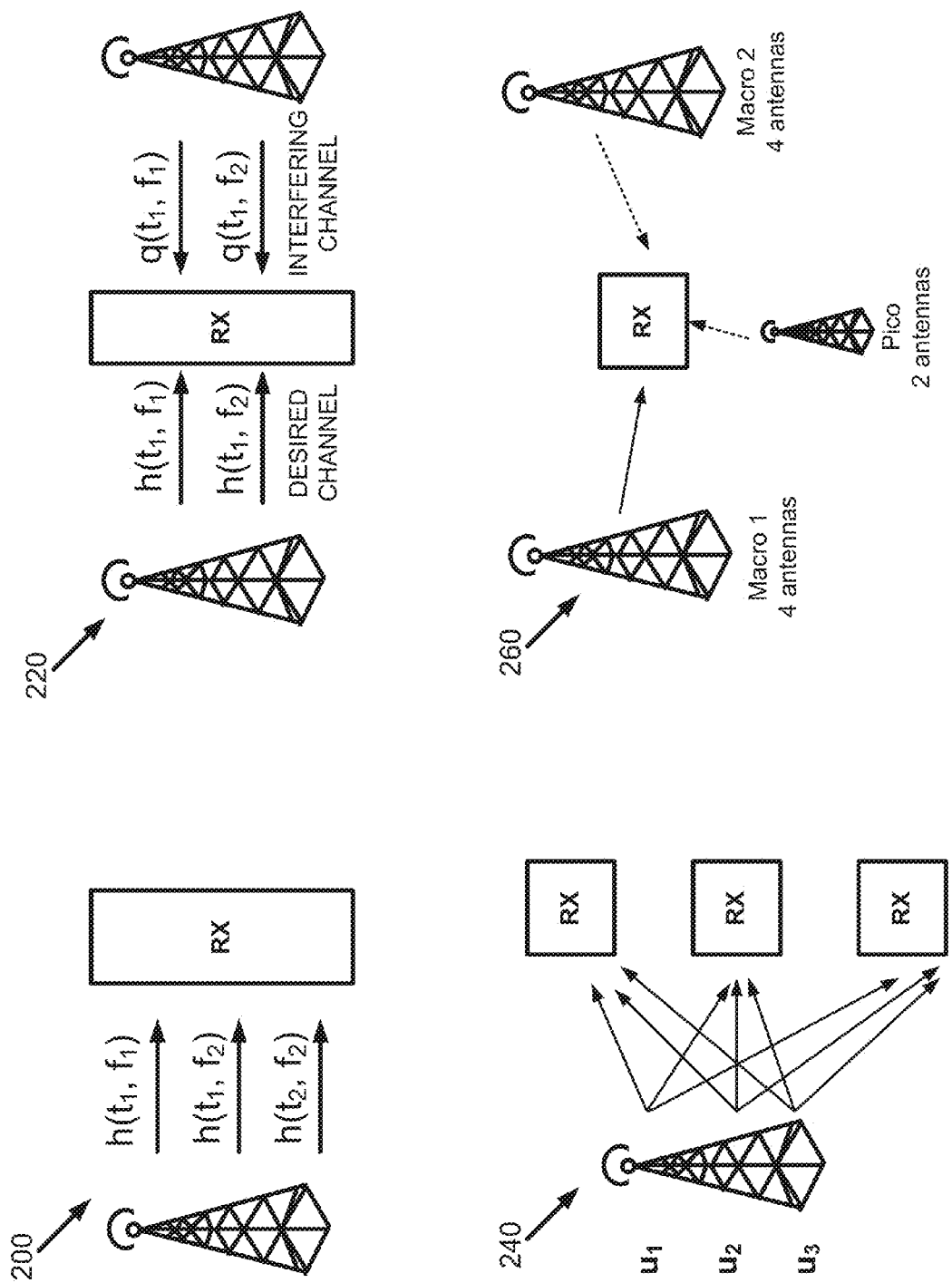
FIG. 2 depicts example systems in which a joint estimation of one or more desired layers and one or more interfering layers may be performed.

FIG. 2 depicts example systems in which a joint estimation of one or more desired layers and one or more interfering layers may be performed. At 200, a MIMO-OFDM system is depicted, where a receiver makes three noisy observations of the channel between a transmitter and a receiver. MIMO-OFDM systems may create parallel layers (i.e., channels, streams) in time and frequency, as illustrated by the three parallel layers $h(f_1, t_1)$, $h(f_2, t_1)$, and $h(f_2, t_2)$. The three different observations made at the receiver may be represented by the following equations, where y represents a signal received at the receiver, h is the channel, and n is a noise component of the received signal:

$$y(f_1,t_1)=h(f_1,t_1)+n_1$$

$$y(f_2,t_1)=h(f_2,t_1)+n_2$$

$$y(f_2,t_2)=h(f_2,t_2)+n_3$$

In the equations above, both y and h are dependent on frequency (f) and time (t). The variables $n_1$, $n_2$, and $n_3$ illustrate that the receiver observes three different noise values in making the observations. Performing the joint estimation of the variables in the equations above may be preferable to performing an independent estimation of the variables. For example, if each of the variables is independently estimated, the effect of receiver noise may not be reduced, and thus, an estimation error $N_0$ may result. Further, the actual channel variables are likely not independent, due to limited degrees of freedom in the physical channel. Performing a joint estimation of the variables of the system 200 may provide an estimate of the channel that accounts for such dependencies between variables.

At 220, another MIMO-OFDM system is depicted, where a receiver makes two observations, with each of the observations including a term representing one or more desired layers and a term representing one or more interfering layers. The two observations made at the receiver may be represented by the following equations, where y represents a signal received at the receiver, h represents a desired layer, q represents an interfering layer, and n is a noise component of the received signal:

$$y(f_1,t_1)=h(f_1,t_1)+q(f_1,t_1)+n_1$$

$$y(f_2,t_1)=h(f_2,t_1)+q(f_2,t_1)+n_2$$

In the equations above, y, h, and q are dependent on frequency (f) and time (t). In performing a joint estimation of the desired and interfering layers, a more accurate estimation of the one or more desired layers may result by performing a lower-resolution frequency estimation of the one or more interfering layers. The lower-resolution frequency estimation of the one or more interfering layers may involve estimating only statistics of the interfering layers (e.g., rather than instantaneous values of the interfering layers), such that more resources can be devoted to estimating the one or more desired layers. Generally, it may be preferable to use a higher-resolution frequency estimation of the desired layers, as compared to the interfering layers.

At 240, a multi-user MIMO (MU-MIMO) system is depicted. The MU-MIMO system includes a transmission from a transmitter to multiple receivers (i.e., multiple users) at the same time. The MU-MIMO architecture may improve a capacity of MIMO transmission by creating additional spatial degrees of freedom. The MU-MIMO architecture may have a higher spatial multiplexing gain and system capacity as versus single-user MIMO (SU-MIMO) systems. The transmitter may use precoding vectors $u_1$, $u_2$, and $u_3$, which correspond to the three receivers of the system. As illustrated at 240, each of the receivers receives data over three layers, where two of the three layers are interfering layers, and one of the layers is a desired layer. The two interfering layers may be caused due to the parallel transmissions from the transmitter to the other receivers of the system. Each of the receivers may estimate the channel by performing a joint estimation of the two interfering layers and the desired layer.

At 260, a coordinated multi-point transmission (CoMP) technique is depicted. The system at 260 includes three base station antennas transmitting data to a single receiver (i.e., a single user device). Interfering layers may be caused by interference from base stations other than the one transmitting a desired signal to the receiver. In CoMP, the channel to be estimated may correspond to multiple cells, and the desired layers and the interfering layers of the channel may be estimated at different frequency slots from received channel state information reference symbols (CSI-RS). However, the number of reference signals for CSI-RS may be limited, such that a number of variables may be larger than a number of equations. To allow for reliable estimation of the channel, the interfering layers may be assigned to have a lower frequency resolution than the desired layers during the estimation.

Figure 3:
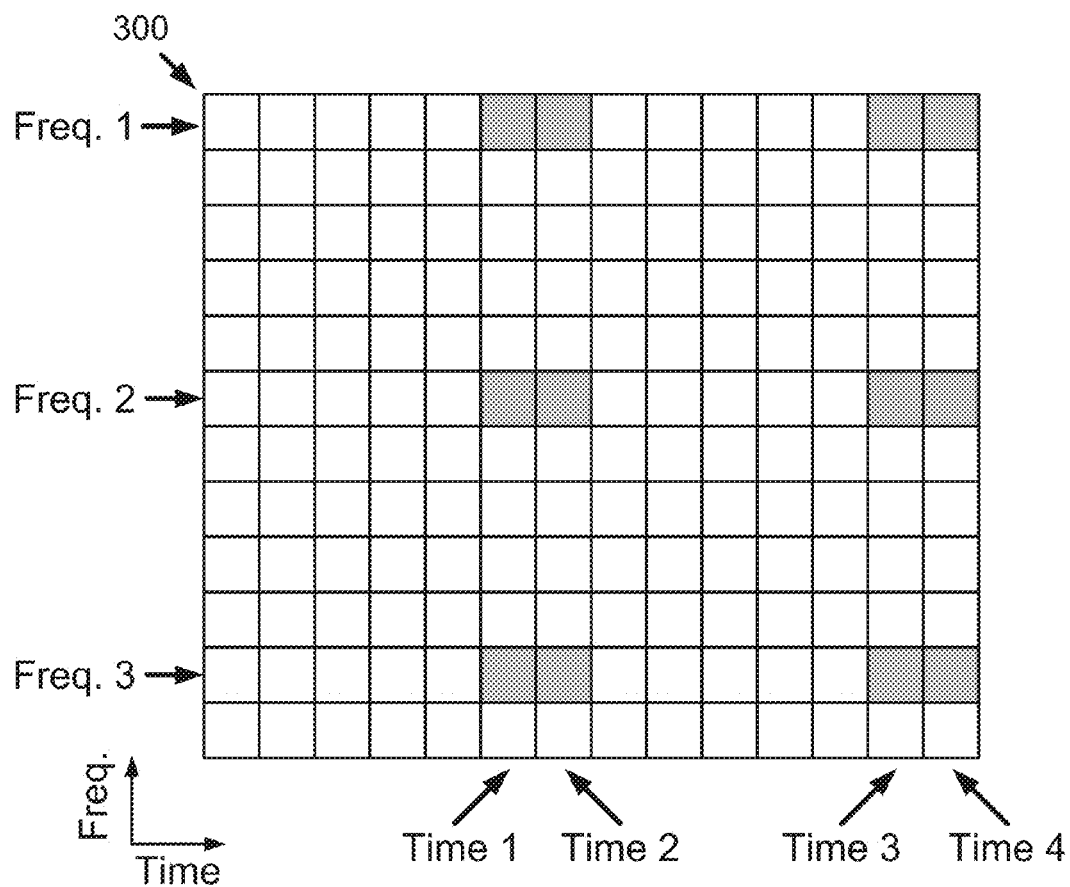
FIG. 3 depicts a matrix including known reference data for various time-frequency positions and an equation that may be solved to jointly estimate one or more desired layers and one or more interfering layers based on the known reference data.

FIG. 3 depicts a matrix 300 including known reference data for various time-frequency positions and an equation 340 that may be solved to jointly estimate one or more desired layers and one or more interfering layers based on the known reference data. The matrix 300 and equation 340 may be used in performing channel estimation in a long-term evolution (LTE) wireless communication system. In LTE Release 10, dynamic switching between Single-User MIMO (SU-MIMO) and Multi-User MIMO (MU-MIMO) is supported. For MU-MIMO transmission, up to four users (i.e., UEs) and up to four layers (i.e., spatial streams) in total are supported (e.g., two desired layers and two interfering layers, three desired layers and one interfering layer, and other combinations). In the LTE system of FIG. 3, channel estimation for demodulation may be performed via demodulation reference signal (DMRS) ports 7 and 8. In the matrix 300 including known reference data used for performing channel estimation, an x-axis represents time, and a y-axis represents frequency. Darkened elements in the matrix 300 represent the known reference data (i.e., pilot symbols), as discussed above with respect to FIG. 1A. Three frequencies (1, 2, and 3) are highlighted in the matrix 300 of FIG. 3. At each of these three frequencies, a receiver in the LTE system makes four observations at four different times (1, 2, 3, and 4). In total, for the three frequencies, twelve observations are made at the receiver in a resource block (RB).

Using the twelve observations made at the receiver, an equation may be solved to jointly estimate the one or more desired layers and the one or more interfering layers:

$$y(f) = S(f) \begin{bmatrix} h_1(f) \\ h_2(f) \\ h_3(f) \\ h_4(f) \end{bmatrix} + n(f)$$

The above equation is depicted at 340 of FIG. 3. In the equation, y(f) is a matrix including data related to the observations made at the receiver, S(f) is a matrix including the known reference data transmitted by the transmitter and is a 4×4 DMRS sequence, $$\begin{bmatrix} h_1(f) \\ h_2(f) \\ h_3(f) \\ h_4(f) \end{bmatrix}$$

is a matrix including data for variables representing the one or more desired layers and the one or more interfering layers to be estimated, and n(f) is a matrix representing a noise component of the received signal y(f). As indicated at 340, the matrix n(f) may be typically modeled as a complex white Gaussian noise with variance $\sigma_0^2$, i.e., $n(f) \sim CN(0, \sigma_0^2 I_4)$, where $\sigma_0^2$ captures the effect of intercell interference. In term of channel estimation on DMRS port 7 and 8 in LTE system, equation 340 in FIG. 3 can be expressed as follows:

$$\begin{bmatrix} y(4(f-1)+1) \\ y(4(f-1)+2) \\ y(4(f-1)+3) \\ y(4(f-1)+4) \end{bmatrix} =$$

$$\underbrace{\begin{bmatrix} a_{4(f-1)+1} & a_{4(f-1)+1} & b_{4(f-1)+1} & b_{4(f-1)+1} \\ a_{4(f-1)+2} & -a_{4(f-1)+2} & b_{4(f-1)+2} & -b_{4(f-1)+2} \\ a_{4(f-1)+3} & a_{4(f-1)+3} & b_{4(f-1)+3} & b_{4(f-1)+3} \\ a_{4(f-1)+4} & -a_{4(f-1)+4} & b_{4(f-1)+4} & -b_{4(f-1)+4} \end{bmatrix}}_{S(f)} \begin{bmatrix} h_1(f) \\ h_2(f) \\ h_3(f) \\ h_4(f) \end{bmatrix} \quad f = 1, 2, 3$$

Solving the equation 340 may allow the channel to be estimated for all potential users and at all time-frequency positions. When the transmitter of the known reference data is operating in a MIMO transmission mode, the channel can be assumed to be constant in time within an RB. Conversely, however, rather than assuming the channel to be frequency-flat within an RB, in solving the equation, it may instead be assumed that the channel is frequency-selective within the RB. As a result of these assumptions, there are twelve variables to be estimated in solving the equation 340: the four layers of the channel in three frequency positions (i.e., $h_1(f)$, $h_2(f)$, $h_3(f)$, and $h_4(f)$, for f equal to 1, 2, and 3). S(f) should be invertible for all frequency positions (1, 2, and 3) to solve the equation 340. However, the individual DMRS sequences are randomly generated, and S(f) may not be full rank with considerable probability (e.g., S(f) may be rank 2 or 3).

To solve the equation 340, a frequency selectivity of the layers $h_1$, $h_2$, $h_3$, and $h_4$ may be captured to the extent possible, and a lower frequency resolution may be used for certain layers as necessary. Thus, to solve the equation 340, certain of the layers are selected to be frequency-flat in the estimation process, and certain of the layers are selected to be frequency-selective in the estimation. Selecting certain of the layers, typically interfering layers, to be frequency-flat may allow the equation 340 to be solved by reducing a number of unknown values in the equation 340. Further, the selection of certain of the layers as being frequency-flat may allow more resources to be devoted to estimating the frequency-selective layers, such that the frequency-selective layers may be estimated with higher accuracy.

Figure 4:
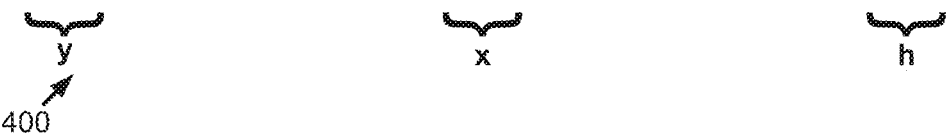
FIG. 4 illustrates proposed solutions for estimating characteristics of a communication channel that include selection of certain aspects of the channel to be frequency-flat and selection of certain aspects of the channel to be frequency-selective in the estimation.
Figure 4:

FIG. 4 illustrates proposed solutions 400, 440 for estimating characteristics of a communication channel by solving the equation 340 of FIG. 3. In the solutions 400, 440, the channel is assumed to include four layers, with one or more desired layers and one or more interfering layers. Further, in both of the solutions 400, 440, the four layers are partitioned based on importance, such that certain of the layers are selected as being frequency-flat and certain of the layers are selected to be frequency-selective in the estimation (e.g., layers that may have a greater effect on performance measures may be selected to be frequency-selective, in order to allow them to have a higher frequency resolution as versus the frequency-flat layers). In the first solution 400 of FIG. 4, two of the four layers are selected as being frequency-selective, and the other two layers are selected as being frequency-flat. The two layers selected to be frequency-selective are the two desired layers in the case of rank 2 allocation, and two layers selected to be frequency-selective are the desired layer and a layer corresponding to the orthogonal DMRS sequence in the case of rank 1 allocation. The other two layers that are not selected to be frequency-selective are selected to be frequency-flat, which results in the modeling of the received signal illustrated at 400:

$$\begin{bmatrix} y(1) \\ y(2) \\ y(3) \\ y(4) \\ y(5) \\ y(6) \\ y(7) \\ y(8) \\ y(9) \\ y(10) \\ y(11) \\ y(12) \end{bmatrix} = \begin{bmatrix} a_1 & a_1 & 0 & 0 & 0 & 0 & b_1 & b_1 \\ a_2 & -a_2 & 0 & 0 & 0 & 0 & b_2 & -b_2 \\ a_3 & a_3 & 0 & 0 & 0 & 0 & b_3 & b_3 \\ a_4 & -a_4 & 0 & 0 & 0 & 0 & b_4 & -b_4 \\ 0 & 0 & a_5 & a_5 & 0 & 0 & b_5 & b_5 \\ 0 & 0 & a_6 & -a_6 & 0 & 0 & b_6 & -b_6 \\ 0 & 0 & a_7 & a_7 & 0 & 0 & b_7 & b_7 \\ 0 & 0 & a_8 & -a_8 & 0 & 0 & b_8 & -b_8 \\ 0 & 0 & 0 & 0 & a_9 & a_9 & b_9 & b_9 \\ 0 & 0 & 0 & 0 & a_{10} & -a_{10} & b_{10} & -b_{10} \\ 0 & 0 & 0 & 0 & a_{11} & a_{11} & b_{11} & b_{11} \\ 0 & 0 & 0 & 0 & a_{12} & -a_{12} & b_{12} & -b_{12} \end{bmatrix} \begin{bmatrix} h_1(1) \\ h_2(1) \\ h_1(2) \\ h_2(2) \\ h_1(3) \\ h_2(3) \\ h_3 \\ h_4 \end{bmatrix} + n$$

In the equation above, y(1) through y(12) represent the twelve observations made at the receiver, and the variable n represents a noise in the signal received at the receiver. Variables $h_1$ and $h_2$ represent the layers selected to be frequency-selective, and thus, these layers are functions of frequencies 1, 2, and 3. Variables $h_3$ and $h_4$ represent the layers selected to be frequency-flat. The matrix including the $h_1$, $h_2$, $h_3$, and $h_4$ variables is multiplied by a matrix including the known reference data S(f) transmitted by the transmitter to the receiver. The selection of certain of the channel layers as being frequency-flat reduces a number of unknown values in the equation.

A least-squares approach to solving the first solution 400 of FIG. 4 is as follows:

$$\hat{h} = (X^H X)^{-1} X^H y$$

where $()^H$ is an operation of Hermitian transpose of a complex matrix. To help ensure full rank and to decrease a dynamic range of the matrix elements after the inverse, a small loading factor may be incorporated as follows:

$$\hat{h} = (X^H X + D)^{-1} X^H y,$$

where D may take the form:

$$D = m I_8 \quad D = \begin{bmatrix} m_1 I_6 & 0 \\ 0 & m_2 I_2 \end{bmatrix},$$

where m, $m_1$, and $m_2$ are fixed constants. Further, the solution may also be regularized with an SNR estimate to minimize noise amplification at low SNR as follows:

$$\hat{h} = \left( X^H X + D + \frac{1}{SNR_{est}} I_8 \right)^{-1} X^H y,$$

where the $$\frac{1}{SNR_{est}}$$

term is a scaling factor that takes into account the SNR estimate.

To estimate interference covariance, $\hat{h}_i$ may represent the least-squares solution for an $i^{th}$ receiver antenna. To determine an interference covariance matrix, the interfering channel estimates from the least squares solution may be correlated across receive antennas, as follows:

$$R = \begin{bmatrix} \hat{h}_3^{(1)} \\ \vdots \\ \hat{h}_3^{(R)} \end{bmatrix} \begin{bmatrix} \hat{h}_3^{(1)*} & \dots & \hat{h}_3^{(R)*} \end{bmatrix} + \begin{bmatrix} \hat{h}_4^{(1)} \\ \vdots \\ \hat{h}_4^{(R)} \end{bmatrix} \begin{bmatrix} \hat{h}_4^{(1)*} & \dots & \hat{h}_4^{(R)*} \end{bmatrix} + \sigma_0^2 I,$$

where R is equal to a number of receiver antennas. If one of the frequency-selective layers is also interference, the channel of the entire time-frequency slots in an RB may be estimated via interpolation and averaging and may use the following equation:

$$R(f, t) = \begin{bmatrix} \hat{h}_3^{(1)} \\ \vdots \\ \hat{h}_3^{(R)} \end{bmatrix} \begin{bmatrix} \hat{h}_3^{(1)*} & \dots & \hat{h}_3^{(R)*} \end{bmatrix} + \begin{bmatrix} \hat{h}_4^{(1)} \\ \vdots \\ \hat{h}_4^{(R)} \end{bmatrix}$$

$$\begin{bmatrix} \hat{h}_4^{(1)*} & \dots & \hat{h}_4^{(R)*} \end{bmatrix} + \begin{bmatrix} \hat{h}_2^{(1)}(f, t) \\ \vdots \\ \hat{h}_2^{(R)}(f, t) \end{bmatrix} \begin{bmatrix} \hat{h}_2^{(1)*}(f, t) & \dots & \hat{h}_2^{(R)*}(f, t) \end{bmatrix} + \sigma_0^2 I$$

A MIMO equalizer may account for the effect of the interference for every time-frequency slot before decoding. For example, a whitening filter may be used to eliminate interference in the received signal y prior to its receipt at the receiver. The whitened signal $y_w$ may be determined as follows:

$$y_w = R^{-1/2} y$$

In the second solution 440 of FIG. 4, only a single desired layer is selected to be frequency-selective, and the other layers are selected to be frequency-flat. By contrast, in the first solution 400 of FIG. 4, the receiver (i.e., user or UE) selects two layers for frequency-selective estimation regardless of its rank. Thus, the second solution 440 may decrease the estimation complexity as versus the first solution 400 of FIG. 4. For example, in the case of rank 1, there may be a single desired layer and three interference layers, and under the second solution 440, even a dominant interference layer may be assumed to be frequency-flat. The second solution 440 thus causes a loss of frequency granularity in the estimation, but this may be acceptable if the interference layers do not appear to be too strong. Making these assumptions, modeling of the received signal may be represented via the formulation 440 of FIG. 4:

$$\begin{bmatrix} y(1) \\ y(2) \\ y(3) \\ y(4) \\ y(5) \\ y(6) \\ y(7) \\ y(8) \\ y(9) \\ y(10) \\ y(11) \\ y(12) \end{bmatrix} = \begin{bmatrix} a_1 & 0 & 0 & a_1 & b_1 & b_1 \\ a_2 & 0 & 0 & -a_2 & b_2 & -b_2 \\ a_3 & 0 & 0 & a_3 & b_3 & b_3 \\ a_4 & 0 & 0 & -a_4 & b_4 & -b_4 \\ 0 & a_5 & 0 & a_5 & b_5 & b_5 \\ 0 & a_6 & 0 & -a_6 & b_6 & -b_6 \\ 0 & a_7 & 0 & a_7 & b_7 & b_7 \\ 0 & a_8 & 0 & -a_8 & b_8 & -b_8 \\ 0 & 0 & a_9 & a_9 & b_9 & b_9 \\ 0 & 0 & a_{10} & -a_{10} & b_{10} & -b_{10} \\ 0 & 0 & a_{11} & a_{11} & b_{11} & b_{11} \\ 0 & 0 & a_{12} & -a_{12} & b_{12} & -b_{12} \end{bmatrix} \begin{bmatrix} h_1(1) \\ h_1(2) \\ h_1(3) \\ h_2 \\ h_3 \\ h_4 \end{bmatrix} + n$$

In the equation above, y(1) through y(12) represent the twelve observations made at the receiver, and the variable n represents a noise in the signal received at the receiver. Variable $h_1$ represents the single layer selected to be frequency-selective, and thus, this layer is a function of frequencies 1, 2, and 3. Variables $h_2$, $h_3$, and $h_4$ represent the layers selected to be frequency-flat. The matrix including the $h_1$, $h_2$, $h_3$, and $h_4$ variables is multiplied by a matrix including the known reference data S(f) transmitted by the transmitter to the receiver. The selection of the three layers as being frequency-flat reduces a number of unknown values in the equation and may reduce a complexity of the estimation process.

Both of the solutions 400 and 440 involve selection of certain layers as being frequency-selective and selection of certain layers as being frequency-flat. This partitioning of layers may be achieved based upon a variety of considerations and guidelines. The partitioning may be based on a balance between performance (e.g., SNR, throughput, etc.) and computational complexity, battery life, or power consumption of the receiver. For example, by selecting more channels to be frequency-selective, a higher accuracy estimation may be achieved, but the higher accuracy may come at an expense of a higher computational complexity in the receiver. The higher computational complexity may cause the receiver to consume power faster, thus reducing its battery life. The partitioning process may also be based on the various layers' impact on performance measures, a degree of mutual correlation among the variables to be estimated in reference to an operating regime (e.g., SIR, SNR), a desired performance level, or an instrumentation complexity. For example, if a layer is determined to have a great impact on a performance measure, then the layer may be selected to be frequency-selective, thus enabling a higher resolution frequency estimation for the layer. Further, a combination of the aforementioned considerations may be used in the partitioning. The selection of the layers as being frequency-flat and frequency-selective may allow an increase in throughput as compared to other channel estimation methods.

A least-squares approach to solving the second solution 440 of FIG. 4 may be as follows:

$$\hat{h}=(X^H X)^{-1} X^H y,$$

To help ensure full rank and to decrease a dynamic range of the matrix elements after the inverse, a small loading factor may be incorporated as follows:

$$\hat{h}=(X^H X+D)^{-1} X^H y,$$

where D may take the form:

$$D = m I_6 \quad D = \begin{bmatrix} m_1 I_4 & 0 \\ 0 & m_2 I_2 \end{bmatrix},$$

where m, $m_1$, and $m_2$ are fixed constants. Further, the solution may also be regularized with an SNR estimate to minimize noise amplification at low SNR as follows:

$$\hat{h} = \left( X^H X + D + \frac{1}{SNR_{est}} I_6 \right)^{-1} X^H y,$$

where the $$\frac{1}{SNR_{est}}$$

term is a scaling factor that takes into account the SNR estimate. A minimum-mean-square-error (MMSE) approach to solve the equation may be as follows:

$$\hat{h}(X^H X+\sigma_0^2 R_h^{-1})^{-1} X^H y.$$

Solving the equation typically involves a matrix inversion. Given the large size of such a matrix, (e.g., 4×4, 8×8, or 12×12, depending on the number of unknowns), it is computationally prohibitive. Based on the observation that such a matrix is structural, a low-computational-complexity matrix inversion can be applied. For example, for equation 400, inverting a 8×8 matrix can be implemented efficiently by $$x_k = \sum_{i=1}^{4} a^*_{4(k-1)+i} b_{4(k-1)+i}, \; y_k = \sum_{i=1}^{4} (-1)^{i-1} a^*_{4(k-1)+i} b_{4(k-1)+i} \; k = 1, 2, 3$$

$$\rho = \sum_{k=1}^{3} |x_k|^2 + |y_k|^2, \; r = 2 \sum_{k=1}^{3} Re(x_k^* y_k),$$

$$P = \frac{1}{(3-\rho)^2 - r^2} \begin{bmatrix} 3-\rho & r \\ r & 3-\rho \end{bmatrix}$$

$$A_k = \begin{bmatrix} x_k & y_k \\ y_k & x_k \end{bmatrix}, \; A = \begin{bmatrix} A_1 \\ A_2 \\ A_3 \end{bmatrix}$$

$$(X^H X)^{-1} = \frac{1}{4} \begin{bmatrix} I_6 + APA^H & -AP \\ -(AP)^H & P \end{bmatrix}$$

Figure 5:
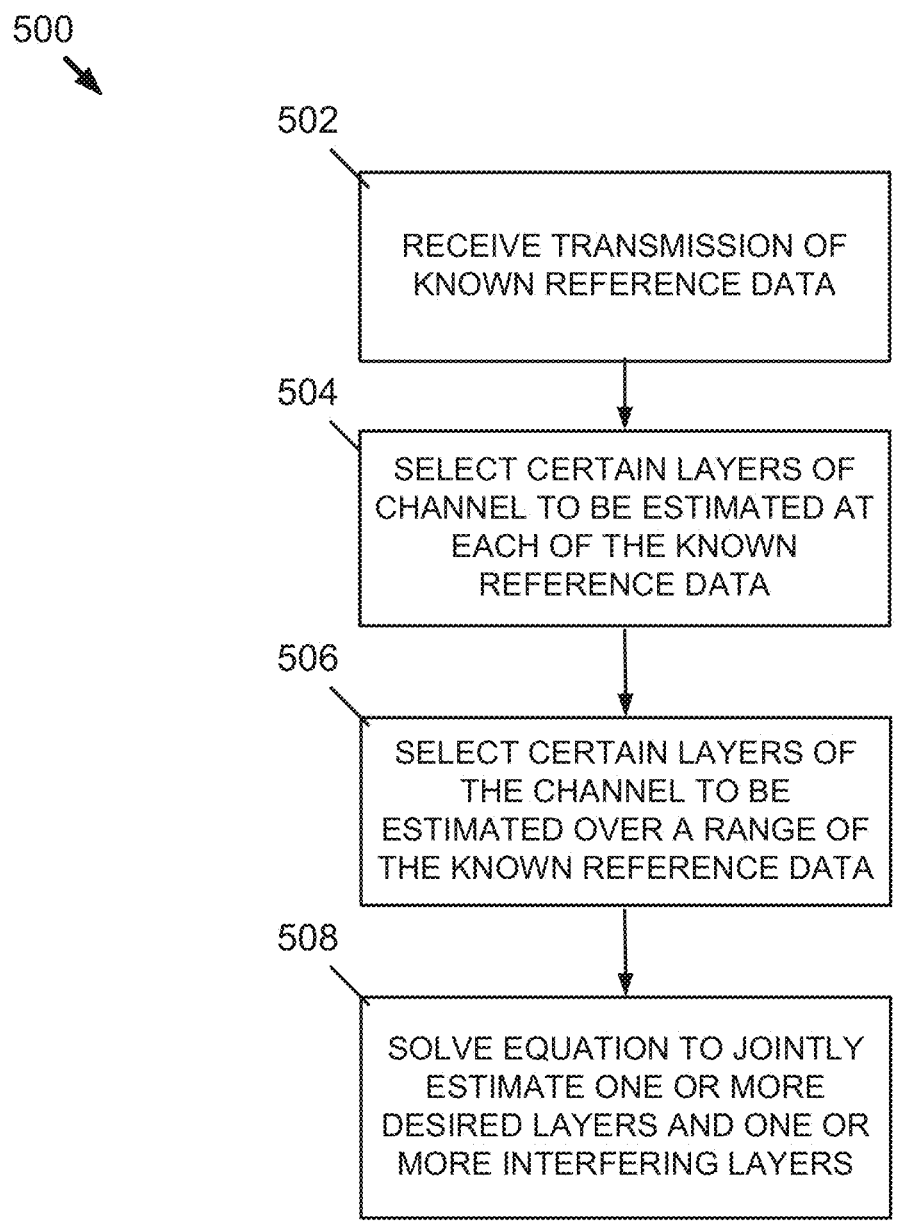
FIG. 5 is a flowchart illustrating an example method for estimating characteristics of a communication channel.

FIG. 5 is a flowchart 500 illustrating an example method for estimating characteristics of a communication channel. At 502, a transmission of known reference data is received at a receiving device. The reference data is transmitted over the channel that includes one or more desired layers and one or more interfering layers. The known reference data is used to determine characteristics of the channel, where the determining includes a joint estimation of the one or more desired layers and the one or more interfering layers. At 504, certain of the layers are selected to be estimated at each of the known reference data. At 506, certain of the layers are selected to be estimated over a range of the known reference data. At 508, an equation is solved to jointly estimate the one or more desired layers and the one or more interfering layers based on the selections. A number of unknown values in the equation is reduced by the selection of certain of the layers as being frequency-flat.

This written description uses examples to disclose the invention, including the best mode, and also to enable a person skilled in the art to make and use the invention. The patentable scope of the invention may include other examples. Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive of" may be used to indicate situations where only the disjunctive meaning may apply.

What is claimed is:

1. A method for estimating characteristics of a channel, the method comprising:
   receiving a transmission of known reference data at a receiving device, wherein the known reference data is transmitted over the channel comprising layers that include one or more desired layers and one or more interfering layers; and
   determining characteristics of the channel based on the known reference data, the determining including a joint estimation of the one or more desired layers and the one or more interfering layers, and the determining including
      selecting certain of the layers to be estimated at each of the known reference data,
      selecting certain of the layers to be estimated over a range of the known reference data,
      selecting certain of the one or more desired layers or the one or more interfering layers to be frequency-flat in the joint estimation, wherein statistics of the frequency-flat layers are used in the joint estimation rather than instantaneous values of the frequency-flat layers, and
      solving an equation for the joint estimation of the one or more desired layers and the one or more interfering layers based on the selections, the selections reducing a number of unknown values in the equation.

2. The method of claim 1, further comprising:
   determining the range of the known reference data for the certain layers based on a frequency or a time over which the layers are selected to be flat; and
   reducing the number of unknown values by solving one unknown value for each of the certain layers over the range of the known reference data.

3. The method of claim 1, further comprising:
   selecting certain of the layers to be frequency-flat and selecting certain of the layers to be frequency-selective, wherein a total number of layers is equal to four, wherein two of the four layers r selected to be frequency-flat, and wherein two of the four layers re selected to be frequency-selective.

4. The method of claim 1, further comprising:
   selecting certain of the layers to be frequency-flat and selecting certain of the layers to be frequency-selective, wherein the one or more desired layers are selected to be frequency-selective, and wherein the one or more interfering layers are selected to be frequency-flat.

5. The method of claim 1, further comprising:
   selecting certain of the layers to be frequency-flat and selecting certain of the layers to be frequency-selective, wherein a dominant interfering layer of the one or more interfering layers is selected to be frequency-selective, and wherein others of the one or more interfering layers are selected to be frequency-flat.

6. The method of claim 1, further comprising:
   solving the equation using at least one of
      (i) a least squares approach;
      (ii) a least squares approach with a loading factor, wherein the loading factor is based on one or more of (1) a predetermined value, (2) a predetermined diagonal matrix, (3) a signal-to-noise ratio (SNR), (4) a signal-to-interference-plus-noise-ratio (SINR), and (5) a computational stability; and
      (iii) a minimal-mean-square-error (MMSE) approach.

7. The method of claim 6, further comprising:
   inverting a matrix by exploiting a structure of the matrix, wherein the inverting includes
      (i) partitioning the matrix into smaller blocks;
      (ii) inverting one or more of the smaller blocks; and
      (iii) computing blocks of the matrix inversion from the smaller block inversions and the smaller blocks.

8. A receiver or estimating characteristics of a channel, the receiver comprising:
   a processing system; and
   a memory coupled to the processing system, wherein the processing system is configured to execute steps including:
   receiving a transmission of known reference data, wherein the known reference data is transmitted over the channel comprising layers that include one or more desired layers and one or more interfering layers; and
   determining characteristics of the channel based on the known reference data, the determining including a joint estimation of the one or more desired layers and the one or more interfering layers, and the determining including
      selecting certain of the layers to be estimated at each of the known reference data,
      selecting certain of the layers to be estimated over a range of the known reference data,
      selecting certain of the one or more desired layers the one or more interfering layers to be frequency-flat in the joint estimation, wherein statistics of the frequency-flat layers are used in the joint estimation rather than instantaneous values of the frequency-flat layers, and
      solving an equation for the joint estimation of the one or more desired layers and the one or more interfering layers based on the selections, the selections reducing a number of unknown values in the equation.

9. The receiver of claim 8, wherein the steps further include:
determining the range of the known reference data for the certain layers based on a frequency or a time over which the layers are selected to be flat; and
reducing the number of unknown values by solving one unknown value for each of the certain layers over the range of the known reference data.

10. The receiver of claim 8, wherein the steps further include:
selecting certain of the layers to be frequency-flat and selecting certain of the layers to be frequency-selective, wherein a total number of layers is equal to four, wherein two of the four layers are selected to be frequency-flat, and wherein two of the four layers are selected to be frequency-selective.

11. The receiver of claim 8, wherein the steps further include:
selecting certain of the layers to be frequency-flat and selecting certain of the layers to be frequency-selective, wherein the one or more desired layers are selected to be frequency-selective, and where the one or more interfering layers are selected to be frequency-flat.

12. The receiver of claim 8, wherein the steps further include:
selecting certain of the layers to be frequency-flat and selecting certain of the layers to be frequency-selective, wherein a dominant interfering layer of the one or more interfering layers is selected to be frequency-selective, and wherein others of the one or more interfering layers are selected to be frequency-flat.

13. The receiver of claim 8, wherein the steps further include:
solving the equation using at least one of
(i) a least squares approach;
(ii) a least squares approach with a loading factor, wherein the loading factor is based on one or more of (1) a predetermined value, (2) a predetermined diagonal matrix, (3) a signal-to-noise ratio (SNR), (4) a signal-to-interference-plus-noise-ratio (SINR), and (5) a computational stability; and
(iii) a minimal-mean-square-error (MMSE) approach.

14. The receiver of claim 13, wherein the steps further include:
inverting a matrix by exploiting a structure of the matrix, wherein the inverting includes
(i) partitioning the matrix into smaller blocks;
(ii) inverting one or more of the smaller blocks; and
(iii) computing blocks of the matrix inversion from the smaller block inversions and the smaller blocks.

15. A method for estimating characteristics of a channel, the method comprising:
receiving a transmission of known reference data at a receiving device, wherein the known reference data is transmitted over the channel comprising layers that include one or more desired layers and one more interfering layers; and
determining characteristics of the channel based on the known reference data, the determining including a joint estimation of the one or more desired layers and the one or more interfering layers, and the determining including
selecting certain of the layers to be estimated at each of the known reference data,
selecting certain of the layers to be estimated over a range of the known reference data,
selecting certain of the layers to be frequency-flat and selecting certain of the layers to be frequency-selective, wherein a total number of layers is equal to four, wherein two of the four layers are selected to be frequency-flat, and wherein two of the four layers are selected to be frequency-selective, and
solving an equation for the joint estimation of the one or more desired layers and the one or more interfering layers based on the selections, the selections reducing a number of unknown values in the equation.

16. A method for estimating characteristics of a channel, the method comprising:
receiving a transmission of known reference data at a receiving device, wherein the known reference data is transmitted over the channel comprising layers that include one or more desired layers and one or more interfering layers; and
determining characteristics of the channel based on the known reference data, the determining including a joint estimation of the one or more desired layers and the one or more interfering layers, and the determining including
selecting certain of the layers to be estimated at each of the known reference data,
selecting certain of the layers to be estimated over a range of the known reference data,
selecting certain of the layers to be frequency-flat and selecting certain of the layers to be frequency-selective, wherein the one or more desired layers are selected to be frequency-selective, and wherein the one or more interfering layers are selected to be frequency-flat, and
solving an equation for the joint estimation of the one or more desired layers and the one or more interfering layers based on the selections, the selections reducing a number of unknown values in the equation.

17. A method for estimating characteristics of a channel, the method comprising:
receiving a transmission of known reference data at a receiving device, wherein the known reference data is transmitted over the channel comprising layers that include one or more desired layers and one or more interfering layers; and
determining characteristics of the channel based on the known reference data, the determining including a joint estimation of the one or more desired layers and the one or more interfering layers, and the determining including
selecting certain of the layers to be estimated at each of the known reference data,
selecting certain of the layers to be estimated over a range of the known reference data,
selecting certain of the layers to be frequency-flat and selecting certain of the layers to be frequency-selective, wherein a dominant interfering layer of the one or more interfering layers is selected to be frequency-selective, and wherein others of the one or more interfering layers are selected to be frequency-flat, and
solving an equation for the joint estimation of the one or more desired layers and the one or more interfering layers based on the selections, the selections reducing a number of unknown values in the equation.

18. A receiver for estimating characteristics of a channel, the receiver comprising:
- a processing system; and
- a memory coupled to the processing system, wherein the processing system is configured to execute steps including:
- receiving a transmission of known reference data, wherein the known reference data is transmitted over the channel comprising layers that include one or more desired layers and one or more interfering layers; and
- determining characteristics of the channel based on the known reference data, the determining including a joint estimation of the one or more desired layers and the one or more interfering layers, and the determining including
  - selecting certain of the layers to be estimated at each of the known reference data,
  - selecting certain of the layers to be estimated over a range of the known reference data,
  - selecting certain of the layers to be frequency-flat and selecting certain of the layers to be frequency-selective, wherein a total number of layers is equal to four, wherein two of the four layers are selected to be frequency-flat, and wherein two of the four layers are selected to be frequency-selective, and
  - solving an equation for the joint estimation of the one or more desired layers and the one or more interfering layers based on the selections, the selections reducing a number of unknown values in the equation.

19. A receiver for estimating characteristics of a channel, the receiver comprising:
- a processing system; and
- a memory coupled to the processing system, wherein the processing system is configured to execute steps including:
- receiving a transmission of known reference data, wherein the known reference data is transmitted over the channel comprising layers that include one or more desired layers and one or more interfering layers; and
- determining characteristics of the channel based on the known reference data, the determining including a joint estimation of the one or more desired layers and the one or more interfering layers, and the determining including
  - selecting certain of the layers to be estimated at each of the known reference data,
  - selecting certain of the layers to be estimated over a range of the known reference data,
  - selecting certain of the layers to be frequency-flat and selecting certain of the layers to be frequency-selective, wherein the one or more desired layers are selected to be frequency-selective, and wherein the one or more interfering layers are selected to be frequency-flat, and
  - solving an equation for the joint estimation of the one or more desired layers and the one or more interfering layers based on the selections, the selections reducing a number of unknown values in the equation.

20. A receiver for estimating characteristics of a channel, the receiver comprising:
- a processing system; and
- a memory coupled to the processing system, wherein the processing system is configured to execute steps including;
- receiving a transmission of known reference data, wherein the known reference data is transmitted over the channel comprising layers that include one or more desired layers and one or more interfering layers; and
- determining characteristics of the channel based on the known reference data, the determining including a joint estimation of the one or more desired layers and the one or more interfering layers, and the determining including
  - selecting certain of the layers to be estimated at each of the known reference data,
  - selecting certain of the layers to be estimated over a range of the known reference data,
  - selecting certain of the layers to be frequency-flat and selecting certain of the layers to be frequency-selective, wherein a dominant interfering layer of the one or more interfering layers is selected to be frequency-selective, and wherein others of the one or more interfering layers are selected to be frequency-flat, and
  - solving an equation for the joint estimation of the one or more desired layers and the one or more interfering layers based on the selections, the selections reducing a number of unknown values in the equation.

* * * * *